S. C. BRINSER.
Horse Rake.
No. 37,672. Patented Feb. 17, 1863.
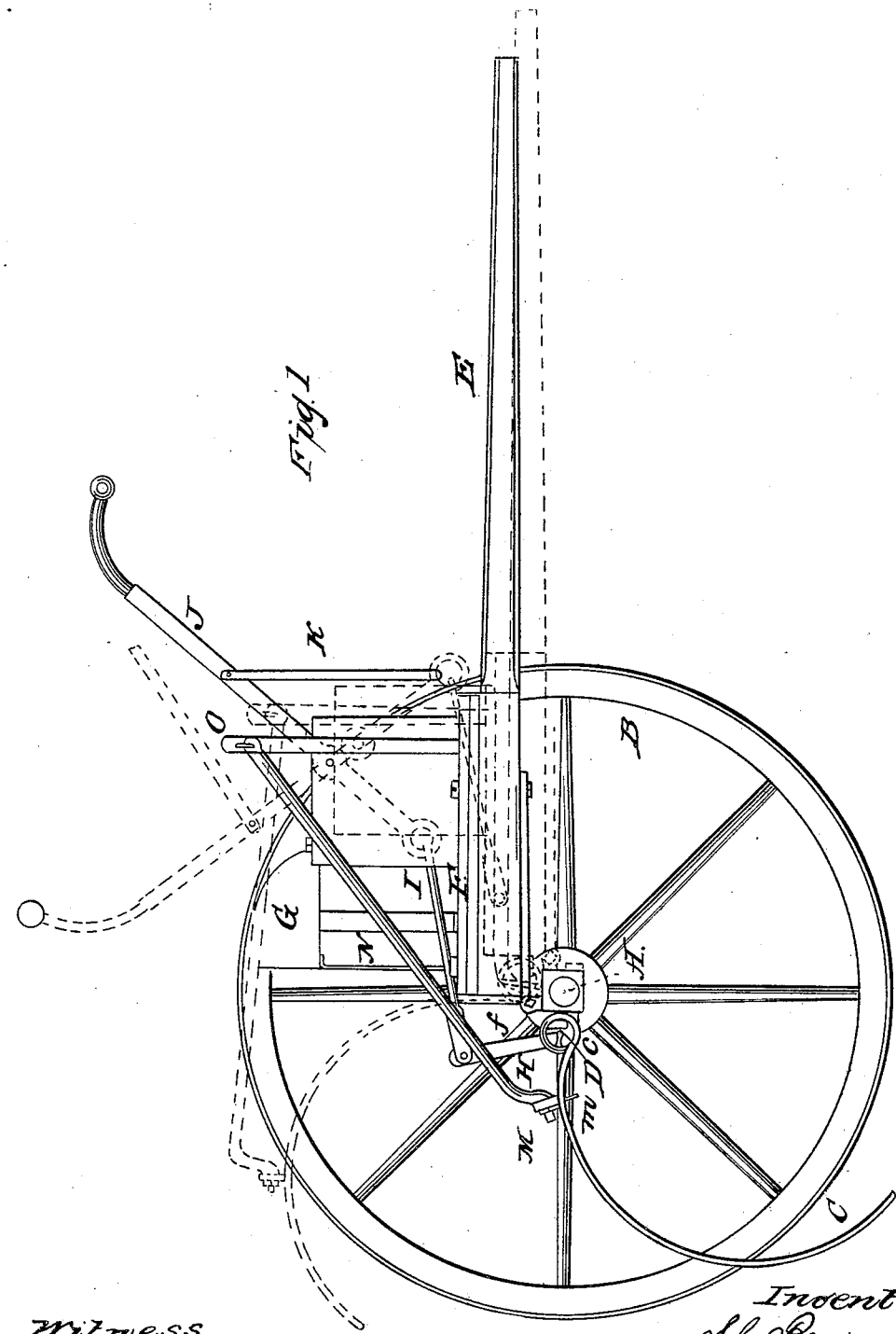

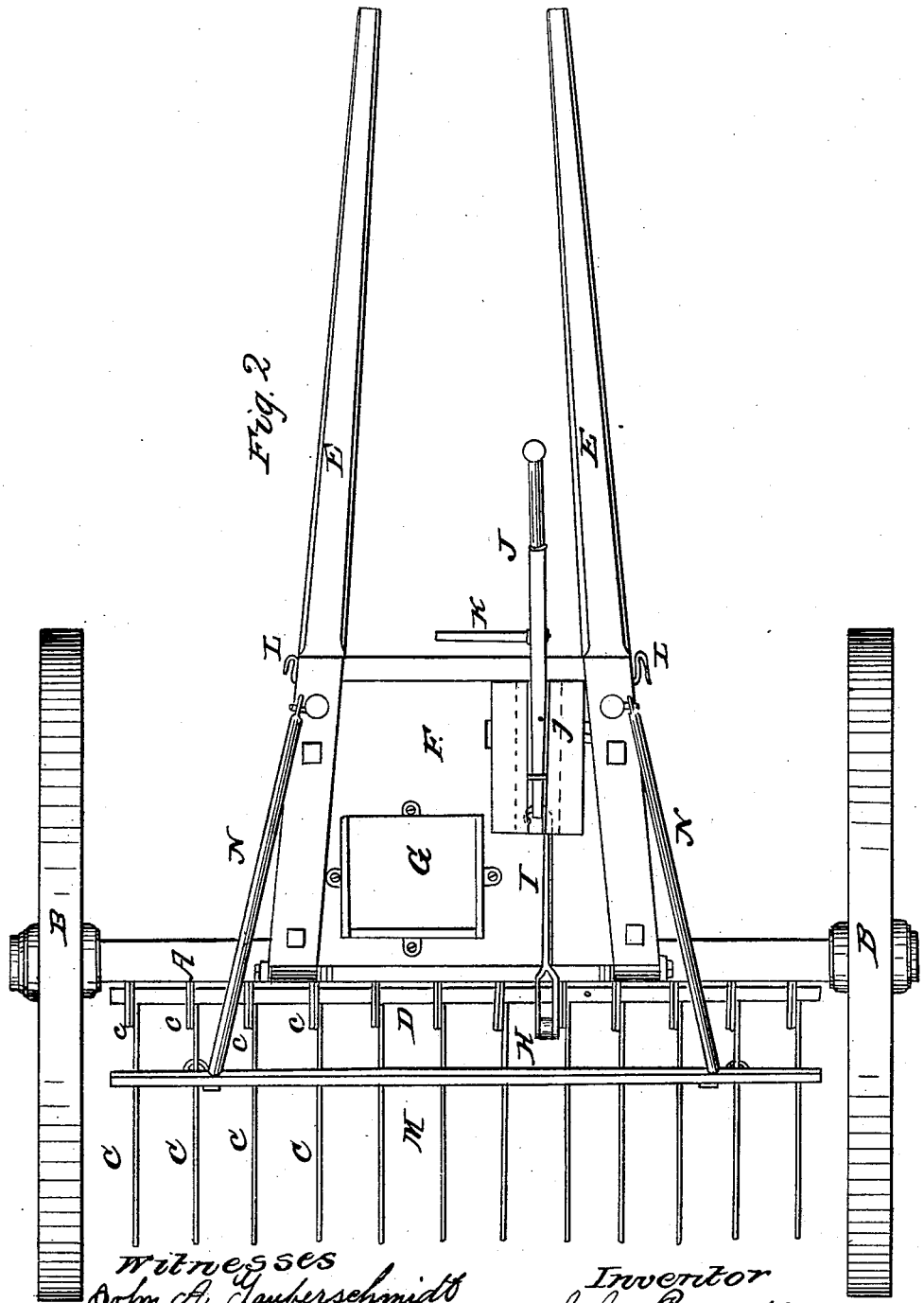

UNITED STATES PATENT OFFICE.

S. C. BRINSER, OF MIDDLETOWN, PENNSYLVANIA.

IMPROVEMENT IN HORSE-RAKES.

Specification forming part of Letters Patent No. 37,672, dated February 17, 1863.

*To all whom it may concern:*

Be it known that I, S. C. BRINSER, of Middletown, in the county of Dauphin and State of Pennsylvania, have invented a new and useful Improvement in Horse-Rakes; and I do hereby declare the following to be a full and exact description of the same, reference being had to the accompanying drawings, making part of this specification, in which—

Figure 1 is a side elevation of my improved rake with one wheel removed. Fig. 2 is a plan or top view of the implement.

Similar letters of reference indicate corresponding parts in both views.

The nature of my invention consists in a peculiar combination and arrangement of parts hereinafter explained, whereby the respective actions of holding down and cleaning the teeth are rendered as nearly automatic as possible, and the labor required to operate the rake correspondingly reduced.

In order that the said invention may be fully understood by others skilled in the art to which it appertains, I will proceed to describe its construction and operation.

A represents an axle resting upon common wheels B B. The said axle constitutes also the rake-head, the teeth C C being inserted in its rear side.

D is a strengthening-bar passing through the coils $c$ of the rake-teeth and bolted to the axle at suitable intervals.

The thills E and bed F are hinged to the upper side of the axle at $f$ near its rear edge, so that their weight and that of the driver upon his seat G will tend to hold the teeth down when in their working position.

A rigid arm, H, projects upward from the rear side of the axle, and is connected by a rod or bar, I, to the lower end of a vertical lever, J, which is fulcrumed at $j$ in a standard upon the bed in convenient proximity to the driver's seat.

K is a treadle or foot-bar depending from the lever J, and turned horizontally toward the center of the machine at its lower end in convenient position to receive the foot of the operator.

Hooks L L for the attachment of the traces are placed in any convenient position upon the thills or bed.

M is a horizontal clearer-bar resting upon the teeth, and confined thereon by staples $m$ in customary manner. The bar M is connected by rods N N to standards O O on the bed F, so that by the rising of the teeth the clearer will be thrown back thereon to the position shown in red in Fig. 1, so as to clear the teeth of hay.

Operation: From the foregoing description it will be apparent that the weight of the driver and of the bed of the implement resting upon the rear edge of the axle tends to hold the teeth down and keep them in contact with the ground, while the draft of the horse, applied through the thills to the upper side of the axle, tends to turn it over and raise the teeth. These two opposing forces are so balanced that while the operation of raking is going on a very slight pressure upon the treadle K serves to keep the teeth in contact with the ground, and when it is desired to raise the teeth to discharge the accumulated hay it is only necessary to remove the foot from the treadle and apply a very slight backward pressure of the hand upon the lever J to start the teeth, when they will be thrown up automatically, as indicated by red lines in Fig. 1, and so held until restored to their working position.

The treadle K constitutes just such a bearing as the driver requires for his feet. The foot is not thrown out of its natural position, and consequently the holding down of the teeth causes no fatigue. On the other hand, the combination and arrangement of parts are such that the elevation of the teeth is effected with the least possible labor to the operator, and herein will be seen the superiority of my rake over those in which the draft is applied to the under side of the axle, in addition to resting the weight of the operator on the rear side of the axle, as I have described. In these latter the forward draft and downward pressure, operating in the same direction, retain the teeth in contact with the ground without labor; but the labor required in raising the teeth to overcome these combined forces, as well as the weight of the teeth and friction of the parts, is so great as to in a great measure do away with the advantage gained.

Having thus described my invention, I claim as new therein and desire to secure by Letters Patent—

The combination of the treadle K, levers J H, and connecting-rod I, constructed and arranged, as specified, with a horse-rake in which the draft is applied to the thills or bed, and the latter hinged to the rear and upper part of the axle, all as herein shown and described, and for the purposes set forth.

The above specification of my improved horse-rake signed this 16th day of December, 1862.

S. C. BRINSER.

Witnesses:
 JAMES H. GRIDLEY,
 CHARLES SMITH.